(12) United States Patent
Park

(10) Patent No.: US 7,657,930 B2
(45) Date of Patent: Feb. 2, 2010

(54) SYSTEM AND METHOD FOR CONFIGURING A DEVICE USING REMOTE CONTROLLER

(75) Inventor: Sung-joon Park, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1002 days.

(21) Appl. No.: 11/251,855

(22) Filed: Oct. 18, 2005

(65) Prior Publication Data

US 2006/0085635 A1 Apr. 20, 2006

(30) Foreign Application Priority Data

Oct. 18, 2004 (KR) .................. 10-2004-0083076

(51) Int. Cl.
*G06F 7/04* (2006.01)
*G06F 15/173* (2006.01)

(52) U.S. Cl. .......................... 726/4; 709/225
(58) Field of Classification Search .............. 726/2–4; 709/225
See application file for complete search history.

(56) References Cited

U.S. PATENT DOCUMENTS 6,801,507 B1 * 10/2004 Humpleman et al. ........ 370/257
7,197,579 B2 * 3/2007 Saito et al. .................... 710/15
2001/0053274 A1 * 12/2001 Roelofs et al. ................ 386/46
2002/0035624 A1 * 3/2002 Kim .......................... 709/222
2003/0140345 A1 * 7/2003 Fisk et al. .................... 725/78

FOREIGN PATENT DOCUMENTS

JP 2003-309882 A 10/2003
JP 2003309882 A * 10/2003

* cited by examiner

*Primary Examiner*—Benjamin E Lanier
(74) *Attorney, Agent, or Firm*—Sughrue Mion, PLLC

(57) ABSTRACT

A system and method for configuring a device using a remote controller are provided. The system includes at least one device which transmits and receives data using a wireless communication connection and performs a preset operation according to a received control signal; a server which communicates data with the at least one device over a radio channel and controls functions of the at least one device; and a short distance wireless communication device that authenticates the at least one device by receiving a device address list through radio communications with the server and assigning a device address selected from the received address list to the at least one device. Thus, inputting password information of the device directly to the server is not required when a new device is configured.

29 Claims, 7 Drawing Sheets

SYSTEM AND METHOD FOR CONFIGURING A DEVICE USING REMOTE CONTROLLER

CROSS-REFERENCE TO RELATED APPLICATIONS

This application claims priority from Korean Patent Application No. 10-2004-0083076 filed on Oct. 18, 2004 in the Korean Intellectual Property Office, the entire disclosure of which is incorporated herein by reference.

BACKGROUND OF THE INVENTION

1. Field of the Invention

Systems and methods consistent with the present invention relate to configuring a device in a network, and more specifically, to configuring a device by registering information of the device to a server without having to directly input the information of the device.

2. Description of the Related Art

Diverse information may be exchanged over networks. If a sender wants to transfer a sensitive message via an electronic mail or an electronic document delivery system, a mechanism is required for the sender to ensure that an intended recipient receives the message, and for the recipient to ensure that the creator of the message is the authentic sender.

Encryption and decryption technology encrypts information to be transmitted using a key value of the information. The recipient decrypts the received information using the key value in order to recover the original information. Thus, the use of encryption and decryption prevent a third party from obtaining the original information from the sender even if the third party intercepts the transmission.

An encryption and decryption system may include a symmetric key cryptography and an asymmetric key cryptography. In symmetric key cryptography, a key Ke for the encryption is the same as a key Kd for the decryption. This may be expressed as Ke=Kd.

Symmetric key cryptography features rapid encryption and decryption, but has disadvantages in key management and key exchange. For instance, each set of a sender and a recipient needs to have a different key from other sets of senders and recipients. Thus, the number of keys to be managed increases. In addition, since both the sender and the recipient need to have the same key, the key is subject to the exposure to others during the key exchange, which complicates the key distribution.

The rapid development of a network environment demands efficient key management and key distribution for secure communications between a plurality of anonymous users. An efficient cryptography is required to enable secure communications among multiple users using the relatively small number of keys and to apply to digital signatures. In response to this need, public key cryptography has been introduced.

Public key cryptography uses a public key and a private key for the authentication, the signatures, and the encryption. As the encryption key is different from the decryption key, the public key cryptography is known as an asymmetric cipher. The public key is exposed to others but the private key, which is called a secret key, is kept secret. The relationship between the key for decryption and the key for encryption in public key cryptography may be expressed as Kd!=Ke.

Public key cryptography uses both the secret key and the public key. The secret key is held privately but the public key is made public. The public key becomes problematic especially when the public key is copied or compromised by a third party. In this situation, the third party may intercept and obtain a sensitive document while the sender and/or the recipient is not aware of the attack of the third party.

To ensure that the public key is not copied or compromised, that is, to ensure the key integrity, public key infrastructure (PKI) has been developed. According to PKI, the public key and a certificate of the public key holder are made publicly available. As the certificate is a document signed by a trusted authority, others cannot modify the contents of the document. Thus, even if the document is compromised, falsification of the certificate can be detected using the signature.

Public key cryptography provides for simple key management as compared to the symmetric key system. However, complexity of the encryption and decryption algorithm is increased in PKI, thereby resulting in decreased processing speed. Thus, the load may greatly increase when the size of the message increases. RSA, developed by Rivest, Shamir, and Adleman, is a public key system that has been prevalently used.

Data communications between devices or between a server and devices also need to ensure and validate that the recipient receives the correct message from the sender and that the sender is an authenticated user. Furthermore, communications between the server and the devices require registration and authentication prior to commencing normal communication therebetween. In this regard, various authentication methods are under consideration to provide for mutual communication.

FIG. 1 depicts a conventional home network system. In FIG. 1, the home network system 100 includes a home server 110 and more than one device 120a through 120d. The devices 120a through 120d may be home appliances such as refrigerators, air conditioners, televisions, audio systems, and the like. The home server 110 can be connected to the devices 120a through 120d over a wireless or wired communication connection. The devices 120a through 120d are controlled through communications between the server 110 and the devices 120a through 120d.

The home server 110 can be connected to the devices 120a through 120d using a cable. Recently, consideration is given to communication methods using a wireless connection. Examples of a wireless communication connection are wireless local area network (WLAN), Bluetooth, and infrared communication (IrDA) connections.

As aforementioned, to control the devices 120a through 120d by the home server 110, the devices 120a through 120d should be registered to the home server 110 when the devices 120a through 120d are initially installed. If the home server 110 wirelessly communicates with the devices 120a through 120d, security of the communicated data and authentication of the devices 120a through 120d are required. In a wireless environment, device authentication is the crucial requirement to provide for secure communication. Authentication verifies whether the devices 120a through 120d allowed access to the home server 110.

In the related art, the device configuration adopts the authentication system using a password (e.g., a secret key), which requires a complicated setup procedure to input and verify password information to the server to register each the devices 120a through 120d by the user.

Alternatively, methods using certificates (e.g., public keys) of a universal plug and play (UPnP) security model are under consideration. These methods require that the user verify information related to the public key of the device. However, the verification requires the password of the device to be input, which makes configuration complex.

Thus, conventional device authentication is vulnerable in view of the security employed. Specifically, in password authentication, the password information may be exposed or lost when the user inputs the password information. In addition, the certificate authentication using dynamic host configuration protocol (DHCP)/auto IP is vulnerable to denial of service (DoS) attacks.

SUMMARY OF THE INVENTION

The present invention provides a system and method for configuring a device using a remote controller to register a device to a server in a communication system between the server and the device, such as a home network.

According to an aspect of the present invention, there is provided a system for configuring a device using a remote controller, including: at least one device which transmits and receives data using wireless communication and performing a preset operation according to a received control signal; a server which communicates data with the at least one device over a radio channel and controls functions of the at least one device; and a short distance wireless communication device which authenticates the at least one device by receiving a device address list through radio communication with the server and assigning a device address selected from the received address list to the at least one device.

The at least one device may communicate with the short distance wireless communication device and the server over different radio channels, respectively.

The server may communicate with the short distance wireless communication device and the at least one device over different radio channels, respectively.

The short distance wireless communication device may transmit and register a unique key value to the server. The server may provide device address list information including address information of the server and address information of the at least one device when the short distance wireless communication device is registered.

The server may provide an encryption value for the short distance wireless communication device through a display device of the server when the short distance wireless communication device is registered. The at least one device may receive the unique key value of the short distance wireless communication device from the short distance wireless communication device.

The at least one device may receive the address information of the server from the short distance wireless communication device, and provide device information of the at least one device to the short distance wireless communication device.

The data transmitted and received between the at least one device and the short distance wireless communication device may be encrypted using a hash function.

The at least one device may request the authentication to the server using the information received via the remote controller. The server may authenticate the at least one device by determining whether the device address information received from the at least one device matches the device address information provided from the server via the short distance wireless communication device when the at least one device requests the authentication.

The server may provide encryption key information for communications to the at least one device when the server authenticates the at least one device. The at least one device may generate new password information by combining the encryption key information received from the server and information held by the at least one device. The server additionally may provide the at least one device with new encryption key information that can be used when the at least one device is re-registered.

In accordance with the above aspect of the present invention, a method for configuring a device using a remote controller is provided, which includes: registering a short distance wireless communication device to a server over a wireless communication connection; assigning a device to be registered by the wireless communication connection one device address that is selected from a device address list provided from the server to the short distance wireless communication device; accessing, at the device, the server using the assigned device address and authenticating, at the server, the device to be registered; and controlling a function of the device through communications between the server and the device after the authentication is complete.

The registering of the short distance wireless communication device to the server may include: transmitting a Device Setup Request message from the short distance wireless communication device to the server; displaying a random value on a display device of the server; inputting the displayed random value through an input device of the short distance wireless communication device and transmitting the input random value to the server; verifying the received random value by the server and authenticating the short distance wireless communication device; and transmitting address information of the device to be registered from the server to the short distance wireless communication device after the authentication is complete.

The information transmitted from the server to the short distance wireless communication device may include address information of the server after the authentication is complete. The information transmitted from the server to the short distance wireless communication device may further include encryption information mapped to address information of the device to be registered when the authentication is complete.

The assigning of the device address to the device to be registered may include: selecting one device address from the device address list provided from the short distance wireless communication device to the server; transmitting a Device Setup Request message including the selected device address to the device to be registered; and transmitting, at the device to be registered, a Device Setup Response message including information of the device to be registered to the short distance wireless communication device.

The Device Setup Request message transmitted may include unique key value information of the short distance wireless communication device. The Device Setup Request message may further include encryption information mapped to the address information of the device to be registered.

The authenticating of the device by the server may include: transmitting a Device Request message to the server using the device address information, which is provided by the server, by the device to be registered; and verifying, by the server, the device address information included in the Device Request message, which is received from the device to be registered, and transmitting a Device Response message to the device if the received device address information matches device address information assigned by the server.

The Device Request message transmitted may include unique key value information of the device, and the address information of the server that is received from the short distance wireless communication device. The Device Response message transmitted may include encryption key information for communications with the device to be registered.

The device may generate new password information by combining the encryption key information received from the server and information held by the device. The device may retransmit the Device Request message including the generated password to the server.

Following the retransmission of the Device Request message, the server may store the received password information, and new encryption key information, which can be used for re-registration of the device, may be additionally transmitted to the device.

The present invention suggests a system and method for controlling a plurality of devices by a single server, and registering and authenticating the devices to the server in a device network system similar to a home network. According to secret key cryptography, the network configuration and authentication for the devices are simultaneously performed using a third device, a short distance wireless communication device such as a remote controller, to thus enhance the usability of the security features. In addition, the network authentication information may be valid only within reliable range of the network such that high-level security can be provided over the entire network. Hereinafter, the short distance wireless communication device is referred to a remote controller.

Additional aspects of the invention will be set forth in part in the description which follows and, in part, will be obvious from the description, or may be learned by practice of the invention.

BRIEF DESCRIPTION OF THE DRAWING FIGURES

The above and other aspects of the invention will become apparent and more readily appreciated from the following description of exemplary embodiments, taken in conjunction with the accompanying drawing figures of which:

DETAILED DESCRIPTION OF THE EXEMPLARY EMBODIMENTS

Figure 1:
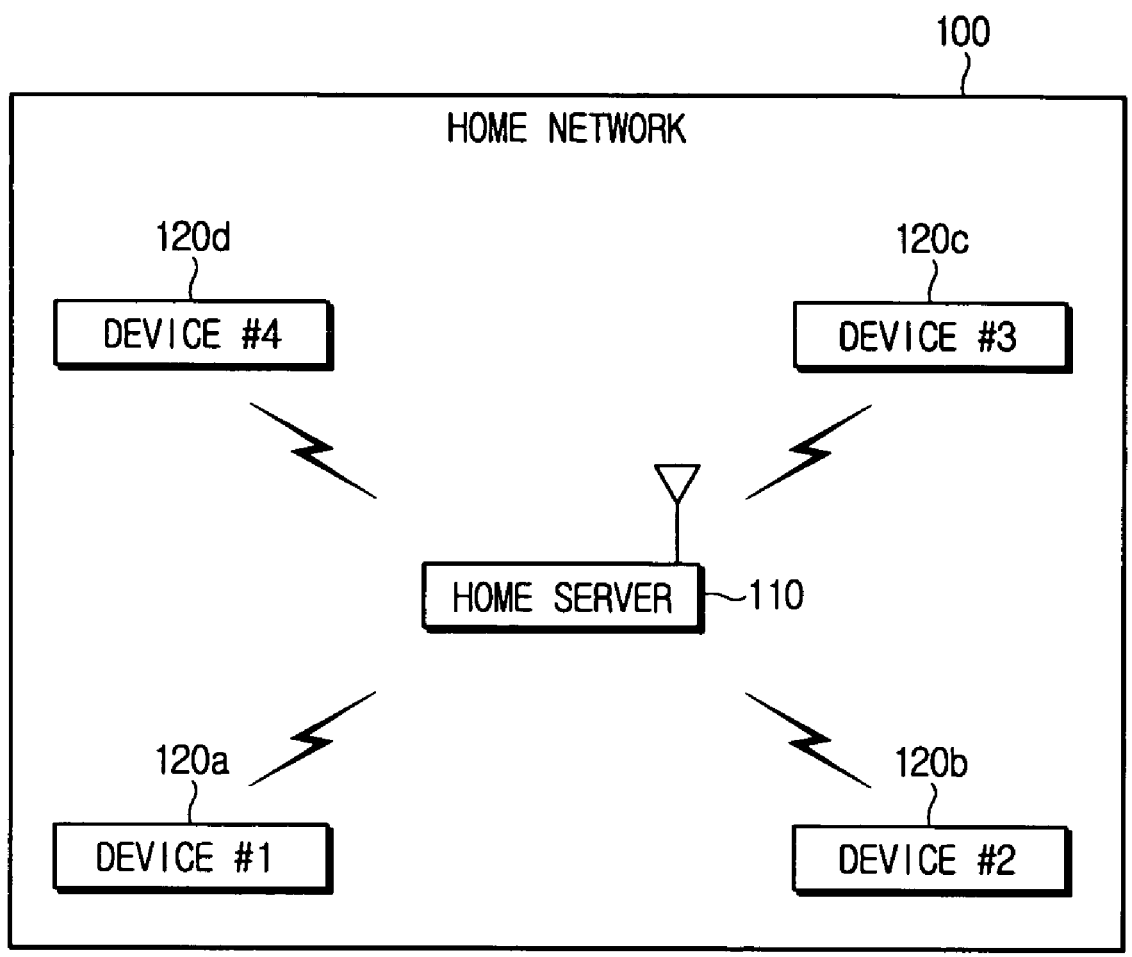
FIG. 1 is a diagram of a conventional home network system.

Reference will now be made in detail to the exemplary embodiments of the present invention, examples of which are illustrated in the accompanying drawings, wherein like reference numerals refer to like elements throughout. The exemplary embodiments are described below to explain aspects of the present invention by referring to the figures.

Figure 2:
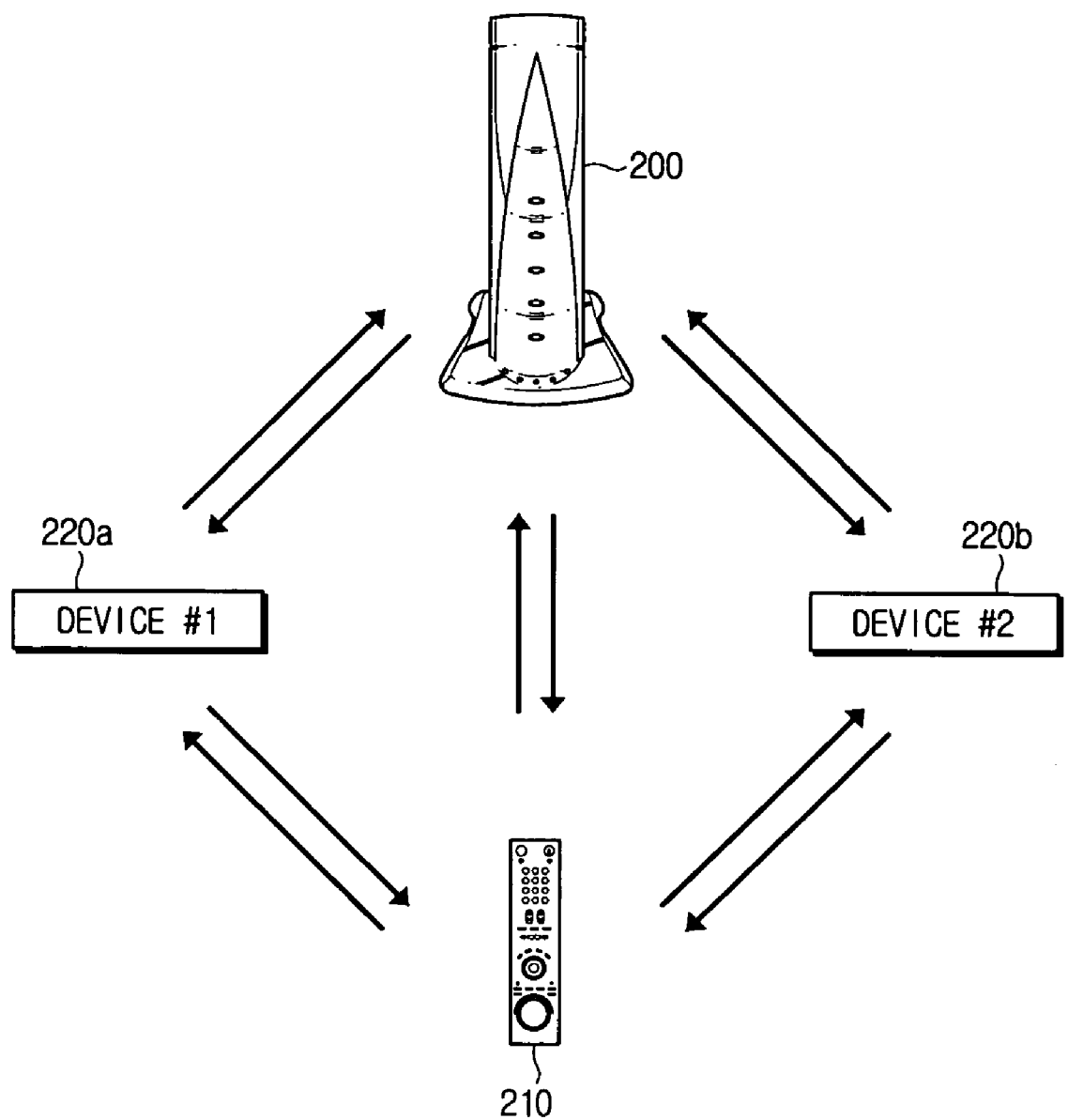
FIG. 2 is a diagram of a device configuration system using a remote controller according to an exemplary embodiment of the present invention.

FIG. 2 illustrates a device configuration system using a remote controller according to an exemplary embodiment of the present invention. In FIG. 2, the device configuration system includes a server 200, a remote controller 210, and devices 220a and 220b.

The related art requires that information relating to the devices 220a and 220b be input directly to the server 200 for the registration and the authentication between the server 200 and the devices 220a and 220b. According to an exemplary embodiment of the present invention, by contrast, the devices 220a and 220b are registered to and authenticated by the server 200 using a third proxy device, the remote controller 210, without requiring direct input to the server 200.

The device configuration system including the server 200 and the devices 220a and 220b may be a home network system, a short distance wireless network system in offices (for example, a wireless local area network (WLAN)), and other radio channels (for example, Bluetooth).

A wireless network is established between the server 200 and the devices 220a and 220b to enable data communications therebetween over a preset radio channel. As the devices 220a and 220b communicate with the server 200 over the radio channel, the devices 220a and 220b are movable. Thus, even if the server 200 is installed indoors and the devices 220a and 220b are moved outside, the server 200 and the devices 220a and 220b can communicate with each other.

The remote controller 210 transmits and receives data to and from the devices 220a and 220b or the server 200 via a short distance wireless communication connection, such as Bluetooth or infrared communication (IrDA). The remote controller 210 is a bi-directional remote controller allowing both data transmission and reception with a device, not a unidirectional remote controller that only transmits data to the device.

Accordingly, the devices 220a and 220b communicate with the server 200 from a distance, and the remote controller 210 communicates with the server 200 or the devices 220a and 220b at a short distance. The devices 220a and 220b, the server 200, and the remote controller 210 may communicate using different channels. However, the communication may occur on the same channel.

The remote controller 210 is first registered to the server 200 to enable the registration of the devices 220a and 220b. The remote controller 210 is assigned at least one device address from the server 200. The at least one device address will be assigned to the devices 220a and 220b. Through the communications between the remote controller 210 and the devices 220a and 220b, one of the pre-assigned device addresses is assigned to the device 220a or 220b. Upon completing the communication with the remote controller 210, the devices 220a or 220b can access, register to, and communicate with the server 200.

Therefore, information relating to the devices 220a and 220b is not required to be directly input to the server 200. In addition, the remote controller 210 is employed for authentication to thus prevent exposure of the authentication password.

Hereinafter, the configuration of a new device is explained in detail according to an exemplary embodiment of the present invention.

Figure 3:
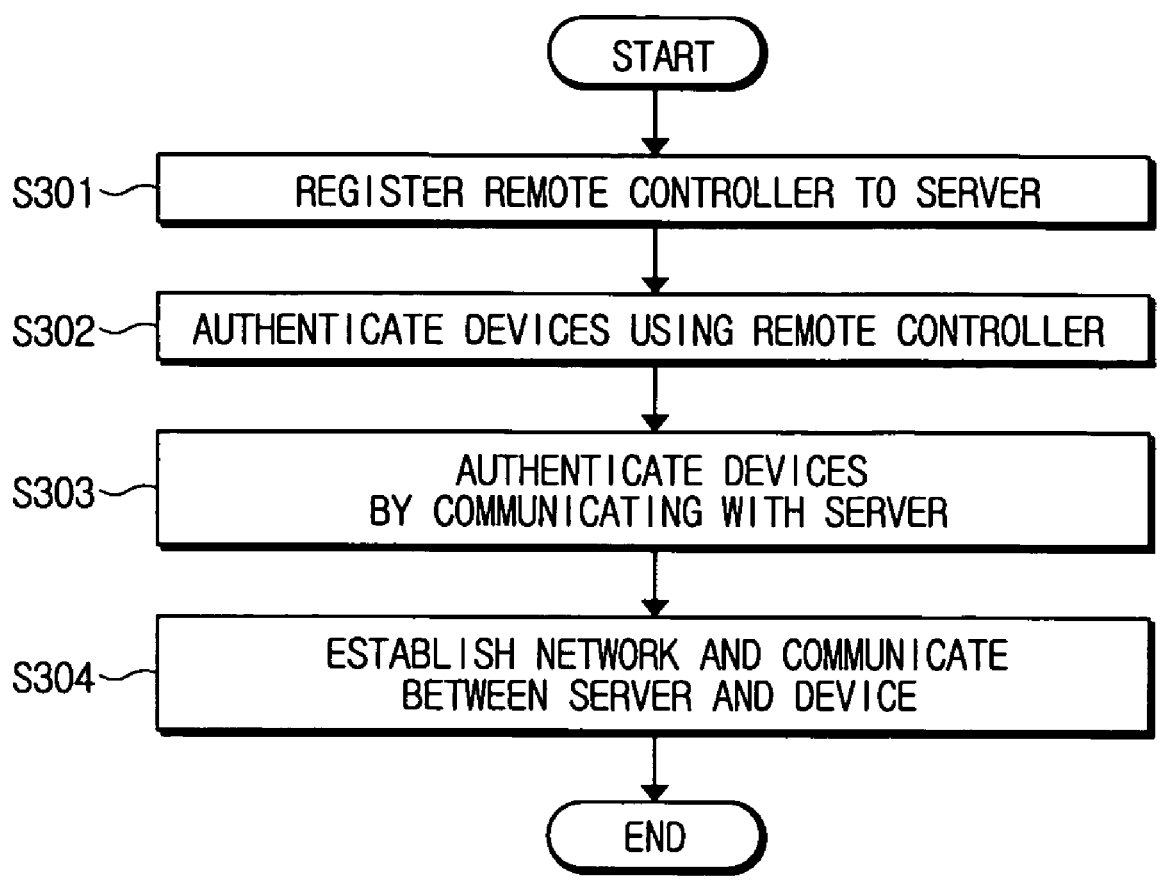
FIG. 3 is a flowchart showing a device configuration procedure according to an exemplary embodiment of the present invention.

FIG. 3 is a flowchart showing the configuration of a new device using the remote controller 210 according to an exemplary embodiment of the present invention. Referring to FIG. 3, the remote controller 210 is registered to the server 200. The registration of the remote controller 210 is first conducted separately from the registration of the new device. Once the remote controller 210 is registered to the server 200, the authentication of devices can be carried out by use of the remote controller 210. The remote controller 210 can receive from the server a list of device addresses assignable to the devices. When configuring the respective devices, the remote controller 210 chooses one address from the received device address list and assigns the address to the respective devices.

When the registration of the remote controller 210 is finished, the new device is authenticated by manipulating the remote controller 210 to register the new device (S302), and one address of the device address list is chosen and assigned to the new device.

Next, when the new device is authenticated using the remote controller 210, the new device, which is assigned the device address, communicates with the server 200 and is authenticated (S303). The new device is assigned a unique password from the server 200 to communicate with the server 200 using the unique password. Thus, the network is established between the server 200 and the devices and data communications are conducted normally (S304).

Figure 4:
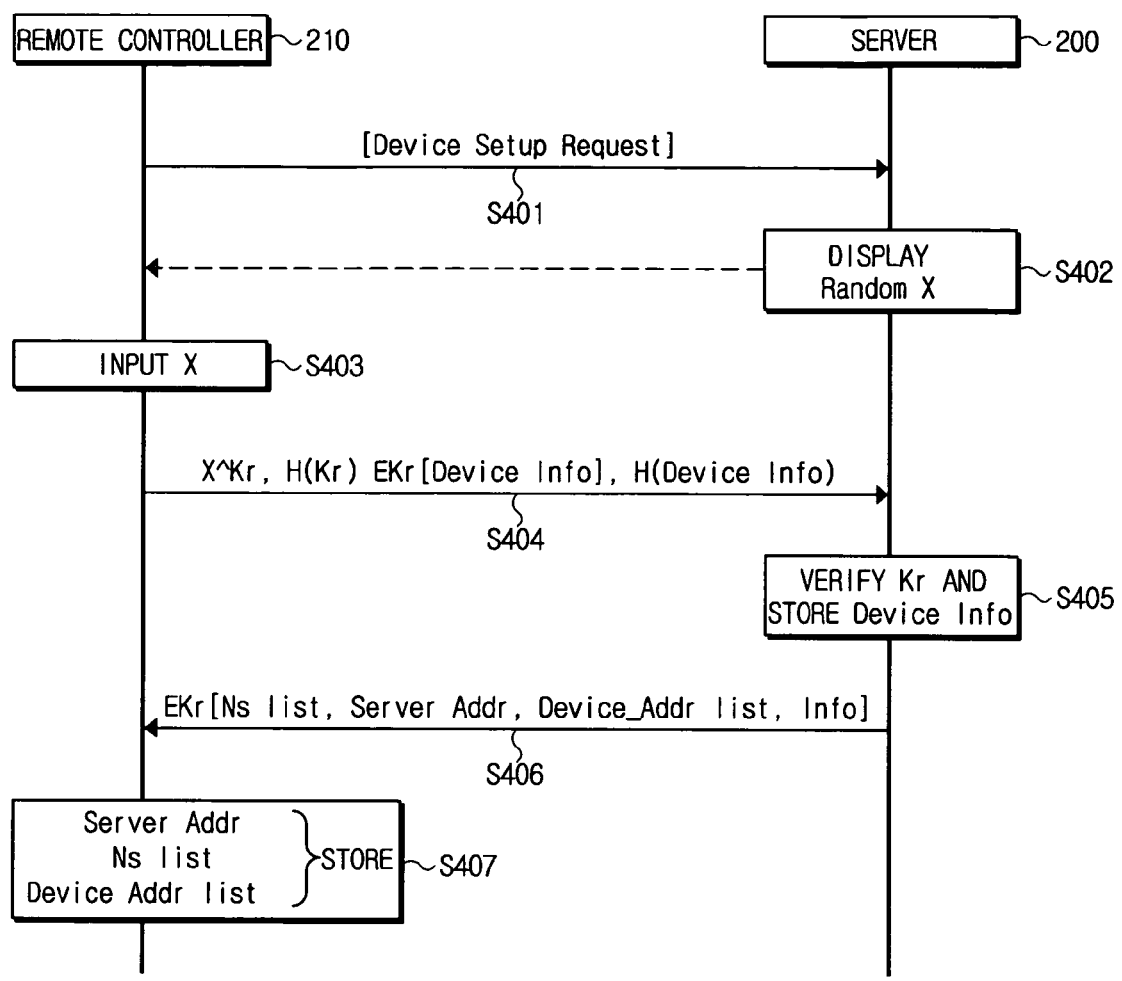
FIG. 4 is a signal flow diagram showing a registration procedure of a remote controller to a server according to an exemplary embodiment of the present invention.
Figure 6:
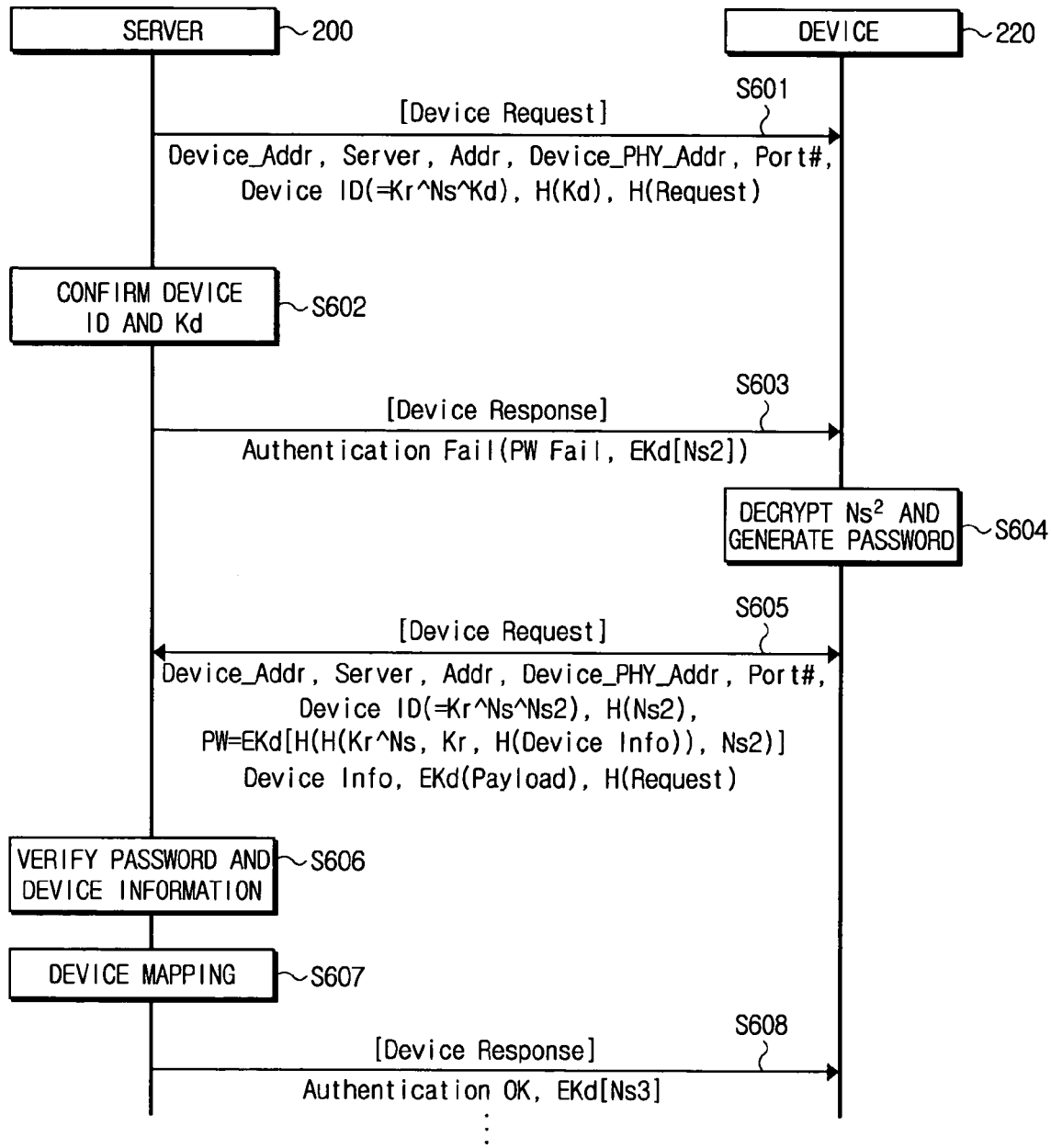
FIG. 6 is a signal flow diagram showing device authentication through communication with the server according to an exemplary embodiment of the present invention.

The following is a further explanation of the device authentication with reference to FIGS. 4 and 6.

FIG. 4 is a signal flow diagram showing registration of the remote controller 210 to the server 200 according to an exemplary embodiment of the present invention. In FIG. 4, to register the remote controller 210 to the server 200 ((S300) in FIG. 3), the user sends a registration request to the server 200 using the remote controller 210. For example, the user may press a registration button or an execution button in a register mode at the remote controller 210 and a Device Setup Request message is transmitted to the server 200 over a short distance wireless communication connection from the remote controller 210 (S401).

The remote controller 210 stores its unique key value (Kr). In addition, remote controller information (R Device Info) including a manufacturer, a model, a production date, a serial number (SN), and the like is stored in remote controller 210. A basic condition for the registration of the remote controller 210 is to allow only an authentic user to access the server 200 and to enable the bidirectional communications between the remote controller 210 and the devices as aforementioned.

Upon receiving the Device Setup Request message from the remote controller 210, the server 200 displays a random value X on its display device, such as a monitor (S402). The user of the remote controller 210 perceives the random value X displayed on the server 200 and inputs the random value X using an input device of the remote controller 210 (S403). Therefore, any unregistered remote controller cannot communicate with the server 200.

Upon receiving the random value X via the remote controller 210, the remote controller 210 transmits to the server 200 its key value (Kr) and the remote controller information (R Device Info) using the input random value X (S404). The format of the transmitted message may be X^Kr, H(Kr)EKr [Device Info], H(Device Info). X^Kr is obtained by performing an operation, for example, an exclusive OR (XOR) operation, on the random value input from the server 200 via the remote controller and the key value (Kr) of the remote controller 210, and the obtained value of X^Kr is transmitted for the normal authentication of the remote controller 210. H(KR), which is obtained from a hash operation of the key value (Kr), is transmitted to the server 200 to allow the server 200 to verify the key value (Kr) of the remote controller 210. EKr[Device Info], which is encrypted from the remote controller information (R Device Info) by the key value (Kr), and H(Device Info), which is hashed from the remote controller information (R Device Info), are transmitted.

The hash function, H( ), which can be used for the data integrity and the message authentication, is adopted for various mechanisms for the sake of the information protection. A hash algorithm compresses a bit string of a certain length using a hash code that is an output value of a fixed length. Most of the hash algorithms adopted to the cryptographic applications are required to offer the strong collision resistance. Hence, even if a certain user acquires the hashed code using the characteristics of the hash function, the certain user cannot obtain the unhashed original value.

In short, the key value (Kr) and the remote controller information (R Device Info) are hashed and transmitted from the remote controller 210 to the server 200.

Upon receiving the key value (Kr) and the remote controller information (R Device Info) from the remote controller 210, the server 200 verifies and stores the received information (S405).

Next, the server 200 transmits to the remote controller 210 server address information (Server_Addr), device address list information (Device_Addr list), and a list of random values assigned by the device address (Ns list) (S406).

The format of the message transmitted from the server 200 can be EKr[Ns list, Server_Addr, Device_Addr list info]. In other words, the information including Server-Addr, Device_Addr list, and Ns list can be encrypted by the key value Kr of the remote controller 210 and transmitted.

The server address information (Server_Addr) is unique address information assigned to identify the server 200. The device address list (Device_Addr list) is a list of addresses to be assigned to the device 220 by the remote controller 210. That is, the device address list (Device_Addr list) is device unique address information related to the addresses that are assignable to the device 220 in order to configure the new device 220 by the remote controller 210, which will be described. The random value assigned by the device address (Ns) is a random encryption value mapped to the device address information in one-to-one manner. Thus, one Device_Addr value and one Ns value can be mapped one-to-one and stored in a table. A device is assigned one Device_Addr value and one Ns value mapped thereto, which will be illustrated.

Upon receiving the information from the server 200, the remote controller 210 interprets the received message using its unique key value (Kr) and stores the server address information (Server_Addr), the device address list information (Device_Addr list), and the random value list (Ns list) (S407). It is to be understood that the mapped information of the device address list information (Device_Addr list) and the random value list (Ns list) are pre-stored in the server 200.

A lamp, such as light emitting diodes (LEDs), for emitting visible light may be provided on the remote controller 210 to inform the user of the normal reception of the message. For example, when commencing the registration upon the selection of the registration button, a red lamp or to illuminate an LED red, and when the authentication from the server 200 is complete, a blue lamp or to illuminate an LED blue.

As a result, the registration of the remote controller 210 to the server 200 is completed. The server 200 obtains the unique information of the remote controller 210, including the key value (Kr) and the remote controller information (R Device Info). The remote controller 210 obtains from the server 200 the server address (Server_Addr), the device address list information (Device_Addr list), and the random value list (Ns list).

Figure 5:
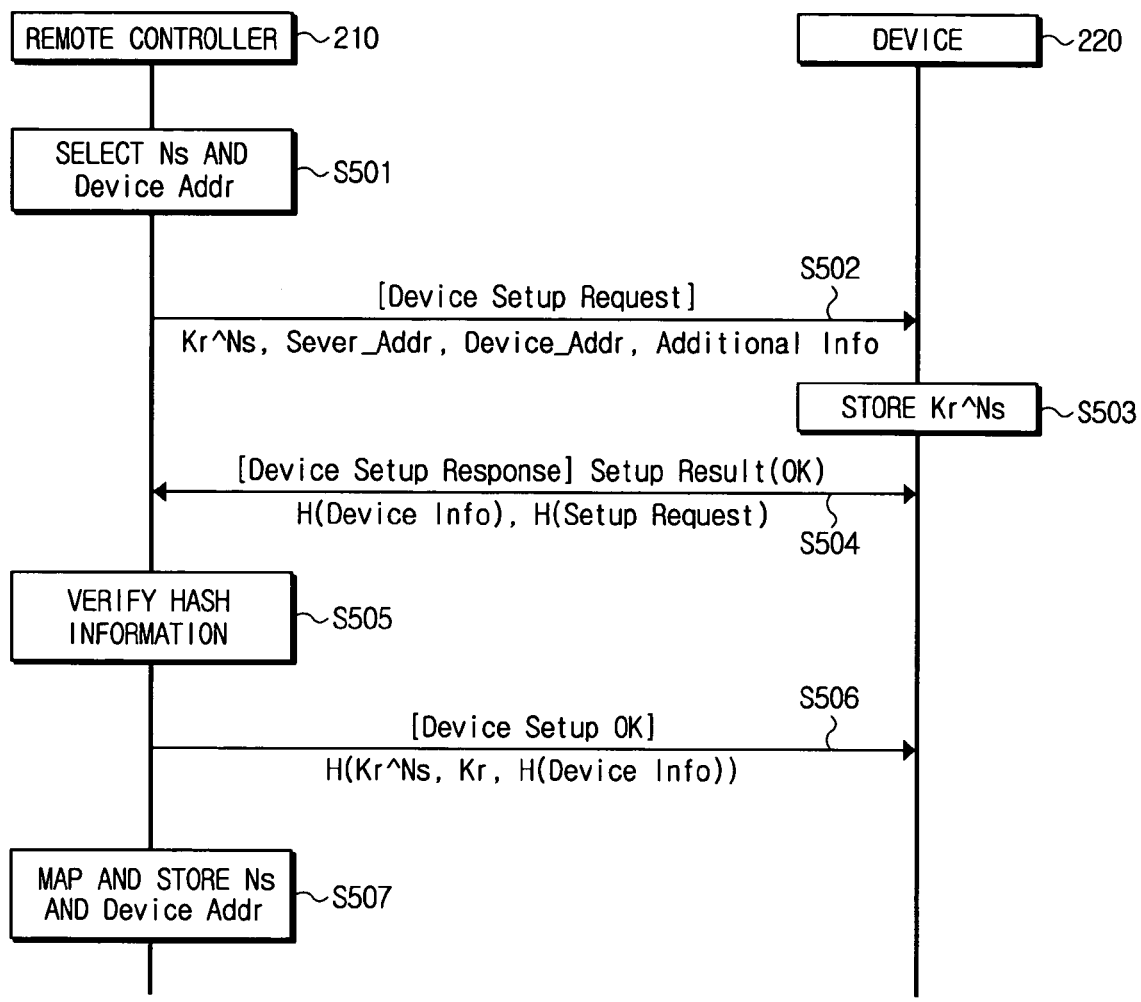
FIG. 5 is a signal flow diagram showing device authentication using the remote controller according to an exemplary embodiment of the present invention.

FIG. 5 is a signal flow diagram showing authentication of the devices 220 using the remote controller 210 according to an exemplary embodiment of the present invention. In FIG. 5, the remote controller 210, which obtains the list (Device_Addr list) of the device addresses assignable to the devices, as illustrated in FIG. 4, assigns the device addresses and the random values (Ns) according to the devices addresses to the device 220 to be registered.

One Ns from the random value list (Ns list) and one device address (Device_Addr) from the device address list (Device_

Addr list), which are assigned via the remote controller 210, are selected (S501), and the device setup is conducted. Next, the Device Setup Request message is transmitted to the device 220 that is to be registered and located adjacent to the remote controller 210 (S502).

The Device Setup Request message may contain the key value (Kr) of the remote controller 210, the address of the relevant server (Server_Addr), the device address (Device_Addr) selected at the remote controller 210, and additional information Additional Info. For example, the Device Setup Request message may include Kr^Ns, Server_Addr, Device_Addr, and Additional Info.

Kr^Ns is obtained by performing an operation, for example, an XOR operation, on the key value (Kr) of the remote controller 210 and the encryption value (Ns) being selected and assigned to the device 220 by the remote controller 210. Kr^Ns is used as an identification (ID) seed value for the device authentication. The device 220 receiving the Device Setup Request message from the remote controller 210 stores the Kr^Ns value that is obtained (S503).

Next, the device 220 transmits a Device Setup Response message in reply to the Device Setup Request message with the result of the device setup request indicated as Setup Result OK (S504). To authenticate the validity of the message, the device 220 transmits to the remote controller 210 H(Device Info), which is hashed from the remote controller device information and H(Setup Request), which is hashed from the Device Setup Response message. Device Info relates to unique information of the device 220, including the manufacturer, the model, the production date, the serial number (SN), and manufacturer information such as uniform resource locator (URL) information. Note that the device 220 stores Device Info as mentioned above and stores its unique key value (Kd), similar to the remote controller 210.

Upon receiving the Device Setup Response message from the device 220, the remote controller 210 verifies the hash information using the received message (S505). To indicate the normal completion of the device setup, the remote controller 210 may be implemented to illuminate a green lamp or to illuminate an LED green.

After verifying the hash information of the Device Setup Response message, the remote controller 210 transmits to the device 220 a Device Setup OK message to indicate the completion of the device setup (S506). The Device Setup OK message may include H(Kr^Ns, Kr, H(Device Info)), specifically, the ID seed value determined from the key value (Kr) of the remote controller 210 and the encryption value (Ns) assigned to the device 220, the unique key value (Kr) of the remote controller 210, and the hashed value of the device information. The transmitted value H(Kr^Ns, Kr, H(Device Info)) is used as a password seed value for the device 220.

The remote controller 210 verifies the hash information of the Device Setup Response message, determines the normal completion of the device setup, maps and stores Ns and Device Addr information (S507). As a result, the authentication between the remote controller 210 and the device 220 finishes.

With reference to FIG. 6, further explanation is made regarding registration of the device 220 that is assigned the device address from the remote controller 210 to the server 200 as illustrated in FIG. 5.

FIG. 6 is a signal flow diagram of the device authentication through communication with the server 200 according to an exemplary embodiment of the present invention. In FIG. 6, the device 220 that is authenticated from the remote controller 210 transmits a Device Request message to the server 200 for authentication from the server 200 (S601). The Device Request message may contain the device address information (Device_Addr) assigned from the remote controller 210 to the device 220, the server address information (Server_Addr), and the device unique information. The Device Request message may contain physical address information of the device 220 (Device_PHY_Addr) and a port number (Port #), if necessary. The physical address information of the device 220 is mapped to the device address information, and indicates Internet protocol (IP) medium access control (MAC) address information. The port number can be used to identify protocols.

For instance, the Device Request message may include Device_Addr, Server_Addr, Device_PHY_ADdr, Port#, Device ID(=Kr^Ns^Kd), H(Kd), H(Request).

Device_Addr and Server_Addr are assigned from the remote controller 210, as shown in FIG. 5. Device_PHY_Addr and Port# are additional information, which may be required by the communication protocol utilized. The device unique information (Device ID), which identifies the device 220, can be obtained by performing an operation, for example, an XOR operation, on the key value (Kr) of the remote controller 210, the encryption value (Ns) assigned from the remote controller 210, and the unique key value (Kd) of the device 220. The unique key value (Kd) of the device 220 is hashed and transmitted to deliver the key value of the device 220 to the server 200. As the server 200 already knows Kr and Ns among the device unique information, the server 200 can verify the unique information of the device 220 using the received Kd contained in the Device Request message. In addition, H(Request), which is hashed from the entire Device Request message, is transmitted to authenticate the validity of the message.

Upon receiving the Device Request message, the server 200 verifies the device unique information (Device ID) and the unique key value (Kd) of the device 220 (S602). Next, the server 200 transmits a Device Response message to the device 220 in response to the Device Request message (S603). Since the encryption value is not yet assigned to the device 220 from the server 200, the Device Response message with information indicating Authentication Fail is transmitted. The Authentication Fail information is transmitted with PW Fail, which indicates the password is not set, and Ns2, which is information required to generate a password, to the device 220. That is, the a Device Response message may include Authentication Fail(PW Fail, EKd[Ns2]). Ns2, which is the password value assigned to the device 220 from the server 200, may be encrypted using the key value (Kd) of the device 220 and transmitted.

Upon the reception of the Device Response message from the server 200, the device 220 decrypts Ns2 from EKd[Ns2] of the received Device Response message using its Kd value, and generates a password (S604).

Next, the device 220 transmits a new Device Request message to the server 200 to indicate the normal reception of the Device Response message and the generation of the password (S605).

The new Device Request message is structured using the newly assigned Ns2 value, instead of Kd, as the device ID in the initial Device Request message. The hashed Ns2 value is transmitted together with the new Device Request message. The device 220 also transmits the password value generated from the received values such as Kr, Ns, Device Info, and Ns2, and the encrypted value of the device information and the payload using Kd.

In short, the new Device Request message may be structured as Device_Addr, Server_Addr, Device_PHY_Addr, Port#, Device ID(=Kr^Ns^Ns2), H(Ns2), PW=EKd[H(H (Kr^Ns, Kr, H(Device Info)), Ns2)], Device Info, EKd(Payload), H(Request).

Upon receiving the new Device Request message from the device 220, the server 200 can verify the generated password and the device information of the device 220 from the received message (S606). Next, the server 200 maps and stores the information of the device 220 to easily facilitate communication with the device 220 (S607). The mapped and stored information includes the ID, the password, the physical address information, and the device information of the device 220.

The server 200 transmits a Device Response message to the device 220 (S608). At this time, the server 200 can transmit a new password to the device 220 together with the Device Response message. For instance, the Device Response message may be structured as Authentication OK, EKd[Ns3].

By additionally transmitting the new password (Ns3) to the device 220, the server 200 can carry out the authentication by the single device request without having to transmit and receive messages to generate the password when the authenticated device 220 requests the re-authentication to the server 200. In more detail, if the device 220 that received the additional password (Ns3) requests to register to the server 200, the device 220 transmits the Device Request message using the additional password (Ns3) (S601) and the server 200 responds with the Device Response message with an Authentication OK message. Therefore, additional transmission of the Device Request message is not necessary.

Meanwhile, as aforementioned, when the server 200 transmits the encryption value information of Ns, Ns2, and Ns3 to the device 220, the encryption values to be transmitted are encrypted using the unique key value (Kd) of the device 220. As a result, the encryption values are prevented from being exposed to other devices and can be transmitted correctly to the intended device.

Parameters which may be used for the device configuration system are as follows:

Header size: Kr (128 bits), Ns (32 bits), address (128 bits), additional information (128 bits), device information (64 bits)

Algorithms: AES 128 bit, MD5 (128 bits)/SHA1 (160 bits)

Figure 7:
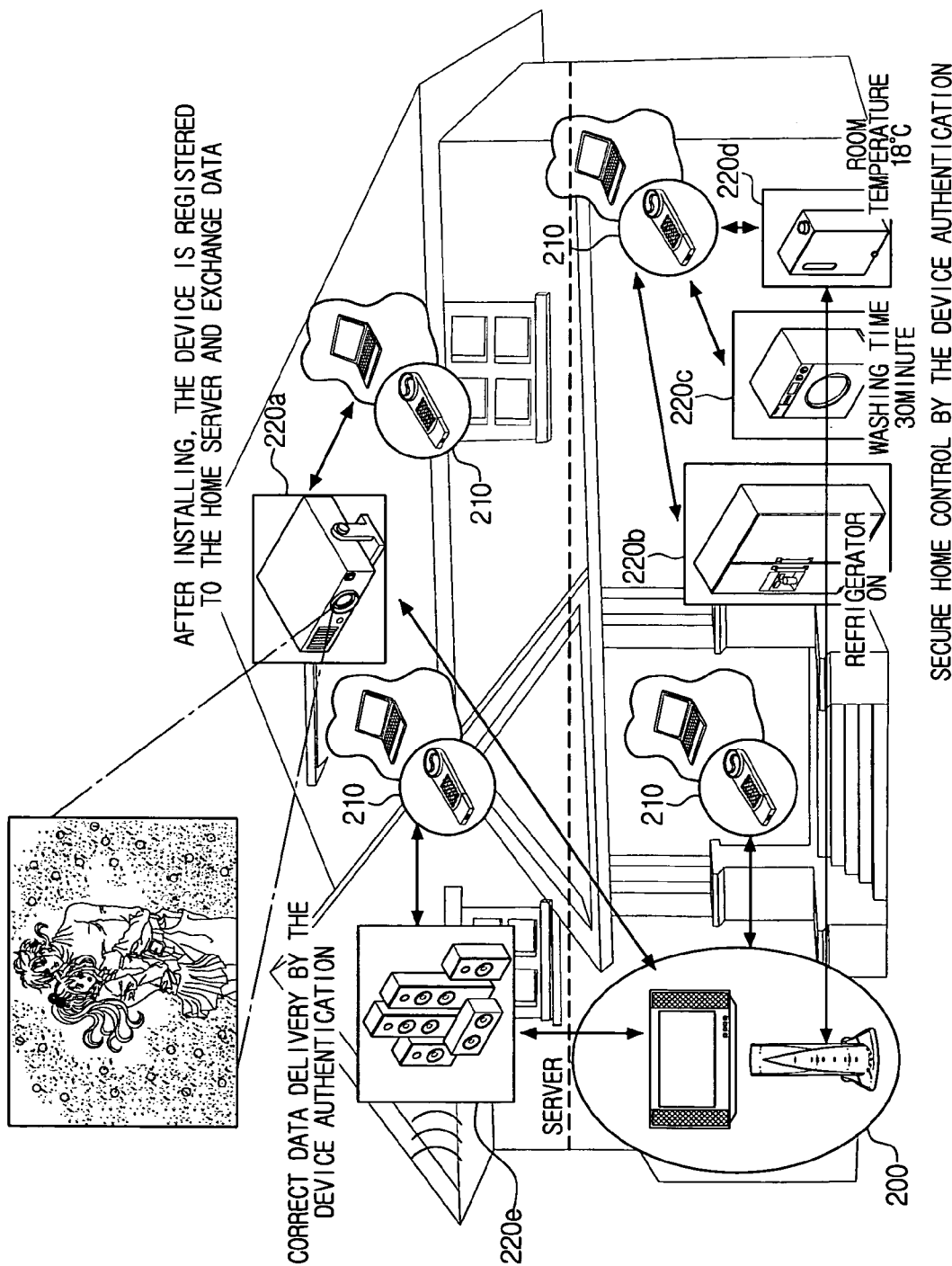
FIG. 7 is a diagram of a scenario applied to a home network system according to an exemplary embodiment of the present invention.

FIG. 7 depicts an application to a home network system according to an exemplary embodiment of the present invention. In FIG. 7, the remote controller 210 is registered to the server 200 as illustrated above. The remote controller 210 receives the list of the device addresses to be assigned to the devices in the home network, from the server 200.

Next, a user registers the devices 220 using the remote controller 210 in the home network, such as a home theatre system 220a, a refrigerator 220b, a washing machine 220c, an air conditioner 220d, and a speaker system 220e. After installing the devices 220, the devices 220 are registered to the home server 200 to exchange data with one another. Thus, the devices 220 can correctly transmit and receive data to and from the server 200 as a result of the authentication. In addition, it is possible to securely control the devices 220 through the authentication. For instance, the refrigerator 220b is turned on, the washing time of the washing machine 220c is regulated, or the temperature of the air conditioner 220d is controlled.

Recently, mobile phones have become available that provide a remote controller function for controlling various devices. It should be understood that the remote controller function according to exemplary embodiments of the present invention is applicable to such mobile phones. In addition, the server of the network may be a home gateway or a set-top box which is responsible for data relay to a foreign network.

As set forth above, when a new device is configured, the cumbersome procedure to input the password information of the device directly to the server is not necessary as compared to the related art.

As the access to the network is allowed only to the device of which the authentication information is received via the remote controller, illegal use of the device can be prevented.

Furthermore, high-level security can be obtained in the wireless environment owing to the dynamic ID and the authentication by the two channels for the device, specifically, the channel between the remote controller or the server and the device, and the channel between the server and the device.

Although exemplary embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A system for configuring a device using a remote controller, comprising:
    at least one device which transmits and receives data using wireless communication and performs a preset operation according to a control signal which is received;
    a server which communicates data with the at least one device over a radio channel and controls functions of the at least one device; and
    a short distance wireless communication device which authenticates the at least one device by receiving a device address list through radio communication with the server and assigning a device address which is selected from the address list which is received to the at least one device.

2. The system according to claim 1, wherein the at least one device communicates with the short distance wireless communication device and the server over different radio channels, respectively.

3. The system according to claim 1, wherein the server communicates with the short distance wireless communication device and the at least one device over different radio channels, respectively.

4. The system according to claim 1, wherein the short distance wireless communication device transmits and registers a unique key value to the server.

5. The system according to claim 4, wherein the server provides device address list information which includes address information of the server and address information of the at least one device if the short distance wireless communication device is registered.

6. The system according to claim 4, wherein the server provides an encryption value of the short distance wireless communication device through a display device of the server if the short distance wireless communication device is registered.

7. The system according to claim 1, wherein the at least one device receives a unique key value of the short distance wireless communication device from the short distance wireless communication device.

8. The system according to claim 1, wherein the at least one device receives address information of the server from the short distance wireless communication device.

9. The system according to claim 1, wherein the at least one device provides device information of the at least one device to the short distance wireless communication device.

10. The system according to claim 1, wherein the data transmitted and received between the at least one device and the short distance wireless communication device is encrypted using a hash function.

11. The system according to claim 1, wherein the at least one device requests authentication with the server using information which is received via the short distance wireless communication device.

12. The system according to claim 11, wherein the server authenticates the at least one device by determining whether device address information which is received from the at least one device matches device address information which is provided from the server via the short distance wireless communication device if the at least one device requests the authentication.

13. The system according to claim 12, wherein the server provides encryption key information for communications to the at least one device if the server authenticates the at least one device.

14. The system according to claim 13, wherein the at least one device generates new password information by combining the encryption key information which is received from the server and information which is stored by the at least one device.

15. The system according to claim 13, wherein the server provides the at least one device with new encryption key information that is used if the at least one device is re-registered.

16. A method for configuring a device using a remote controller, comprising:
    registering a short distance wireless communication device to a server over a wireless communication connection;
    assigning a device to be registered by the wireless communication connection one device address that is selected from a device address list which is provided from the server to the short distance wireless communication device;
    accessing, at the device, the server using the device address which is assigned and authenticating, at the server, the device to be registered; and
    controlling a function of the device through communication between the server and the device after the authenticating is complete.

17. The method according to claim 16, wherein the registering of the short distance wireless communication device to the server comprises:
    transmitting a Device Setup Request message from the short distance wireless communication device to the server;
    displaying a random value on a display device of the server;
    inputting the random value which is displayed through an input device of the short distance wireless communication device and transmitting the random value which is input to the server;
    verifying the random value which is received by the server and authenticating the short distance wireless communication device; and
    transmitting address information of the device to be registered from the server to the short distance wireless communication device after the authentication is complete.

18. The method according to claim 17, wherein the server transmits address information of the server to the short distance wireless communication device after the authentication is complete.

19. The method according to claim 17, wherein the server transmits encryption information, which is mapped to the address information of the device to be registered, to the short distance wireless communication device after the authentication is complete.

20. The method according to claim 16, wherein the assigning of the device address to the device comprises:
    selecting one device address from the device address list which is provided from the short distance wireless communication device to the server;
    transmitting a Device Setup Request message which includes the device address which is selected to the device to be registered; and
    transmitting, at the device to be registered, a Device Setup Response message which includes information of the device to be registered to the short distance wireless communication device.

21. The method according to claim 20, wherein the Device Setup Request message which is transmitted includes unique key value information of the short distance wireless communication device.

22. The method according to claim 20, wherein the Device Setup Request message further includes encryption information which is mapped to the address information of the device to be registered.

23. The method according to claim 16, wherein the authenticating of the device to be registered by the server comprises:
    transmitting a Device Request message to the server using the device address information, which is provided from the server, by the device to be registered; and
    verifying, by the server, the device address information which is included in the Device Request message, which is received from the device to be registered, and transmitting a Device Response message to the device if the device address information which is received matches device address information which is assigned by the server.

24. The method according to claim 23, wherein the Device Request message which is transmitted includes unique key value information of the device to be registered.

25. The method according to claim 23, wherein the Device Request message which is transmitted further includes address information of the server that is received from the short distance wireless communication device.

26. The method according to claim 23, wherein the Device Response message which is transmitted includes encryption key information which is used to communicate with the device to be registered.

27. The method according to claim 26, wherein the device generates new password information by combining the encryption key information which is received from the server and information which is stored by the device to be registered.

28. The method according to claim 27, wherein the device retransmits the Device Request message which includes the password which is generated to the server.

29. The method according to claim 28, wherein, following the retransmission of the Device Request message, the server stores the password information which is received, and
    new encryption key information, which is used to re-register the device to be registered, is transmitted to the device.

* * * * *